May 15, 1956  D. E. SINGELMANN ET AL  2,745,247
ROCKET ASSISTED COMPOSITE ENGINE ARRANGEMENT
Filed Jan. 23, 1952
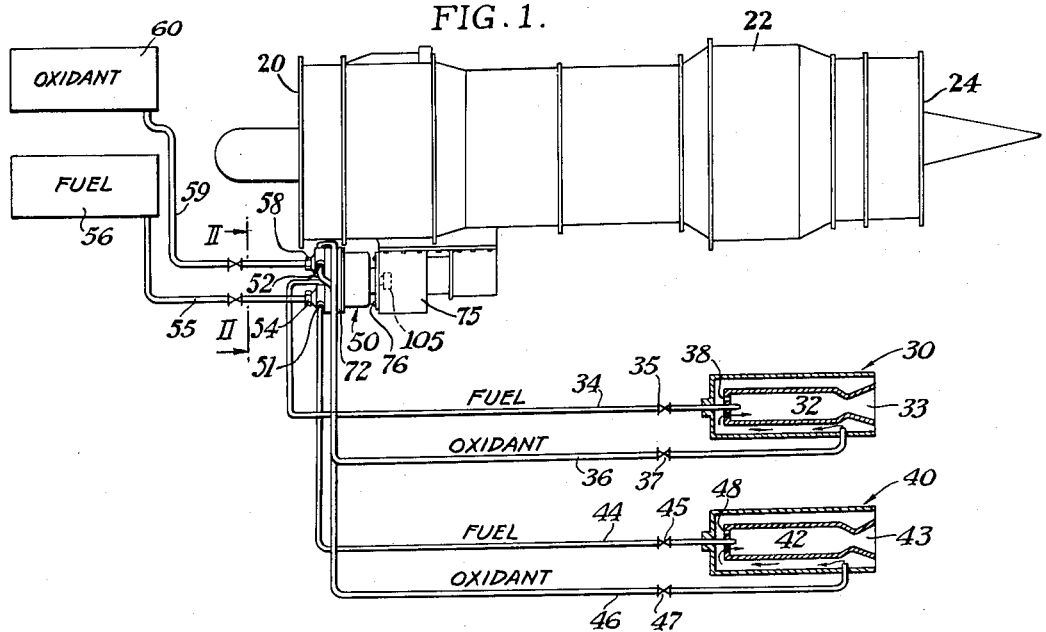
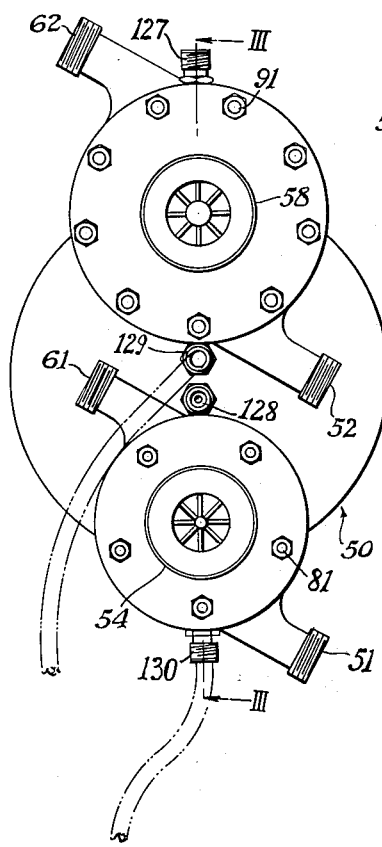
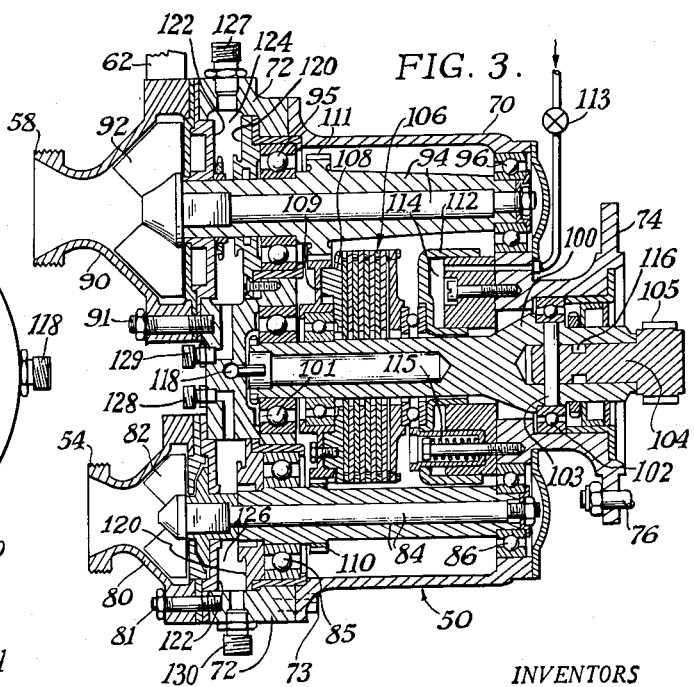
INVENTORS
DEITRICH E. SINGELMANN AND
BY JAMES R. HALL
Bean, Brooks, Buckley & Bean
ATTORNEYS United States Patent Office 2,745,247
Patented May 15, 1956

2,745,247

ROCKET ASSISTED COMPOSITE ENGINE ARRANGEMENT

Dietrich E. Singelmann, New York, and James R. Hall, Buffalo, N. Y., assignors to Bell Aircraft Corporation, Wheatfield, N. Y.

Application January 23, 1952, Serial No. 267,710

6 Claims. (Cl. 60—35.6)

This invention relates to jet propulsion engines for aircraft and the like, and more particularly to an improved rocket-assisted engine arrangement.

Whereas, it is known for example that conventional turbo-jet engines operate most efficiently at medium altitudes and at relatively high airplane speeds, they are much less effective at extremely high altitudes and at take-off speeds. Therefore, we contemplate an improved combination of a conventional turbojet type engine and a pump fed rocket propulsion engine whereby the latter may be selectively used whenever the thrust generated by the turbojet engine proper is inadequate as during takeoffs and/or flight at high altitudes. More specifically, the invention contemplates an arrangement wherein the pump mechanism supplying fuel to the rocket engine is of improved form and mechanically coupled to the turbojet engine shaft, thereby keeping the turbojet engine losses to a minimum.

Therefore, it may be stated that it is a primary object of the present invention to attain the objects and advantages hereinabove referred to.

Another object of the invention is to attain the objects and advantages hereinabove set forth through use of a novel rocket fuel pump and pump drive mechanism such as may be readily mounted upon a standard power take-off pad of the turbojet engine.

Other objects and advantages of the invention will appear from the specification hereinafter.

In the drawing:

Fig. 1 is a schematic illustration, partly in section, showing a composite engine arrangement of the invention;

Fig. 2 is an end view on an enlarged scale, taken along line II—II of Fig. 1, of the rocket propellant pump unit of the invention; and Fig. 3 is a section, taken along line III—III of Fig. 2.

Fig. 1 schematically illustrates a preferred embodiment of the invention in conjunction with a conventional type turbojet engine comprising generally an inlet air scoop 20; a combustion chamber 22; and a jet nozzle 24. The rocket engine assist portion of the organization is illustrated to comprise a pair of rocket motors and pump means for selectively supplying said rocket motors with fuel-oxidizer mixtures, although it will of course be understood that the system is applicable to use of any number of assist rocket motors, as may be desired. Thus, as shown in Fig. 1, dual rocket motors are indicated generally at 30—40 as comprising, respectively, combustion chambers 32—42 terminating in discharge nozzles 33—43 and arranged to be supplied with fuel through separate conduits 34—44 controlled by valves 35—45. Oxidant is furnished to the motors 30—40 by means of conduits 36—46 controlled by valves 37—47; the oxidant gaining access to the combustion chambers 32—42 through combustion chamber ports 38—48.

The rocket engine fuel pump device of the invention is indicated generally at 50, and the fuel lines 34—44 lead to the fuel outlet ports 51 and 61 of the pump (Figs. 1-2). Similarly, the oxidant supply lines 36—46 connect to the oxidant discharge ports 52 and 62 of the pump of the invention. The fuel intake port of the pump of the invention is indicated at 54 and is connected to a fuel supply line 55 which leads from a fuel tank as indicated at 56. The oxidant intake port of the pump is illustrated at 58 as being connected to a supply line 59 leading to an oxidant supply tank 60.

The pump unit 50 of the invention includes a bell-shaped housing 70 having an end plate 72 bolted thereto as indicated at 73; the solid end portion of the casing 70 being formed with a face plate portion 74 adapted to be bolted against a complementary mounting pad of the engine accessory gear box as shown at 75 (Fig. 1) of the turbojet engine, such as is standard equipment for the purpose of mounting thereon generators or other engine accessories designed to be mechanically geared to the rotating engine parts. For detachably mounting the pump 50 on the gear box 75, bolts as indicated at 76 may be employed.

As shown in Figs. 2-3, the fuel pump portion of the pump unit 50 is illustrated to comprise an impeller housing portion 80 which is bolted to the face plate 72 as by means of bolts 81. The housing 80 encloses the pump impeller 82 which is carried by a two-piece pump shaft 84 rotating in bearings 85—86 carried by the face plate 72 and the bell housing 70 respectively. Similarly, the oxidant pump portion of the pump unit 50 includes an impeller housing 90 which is bolted to the end plate 72 as by means of bolts 91, and an impeller 92 carried by a two piece shaft 94 which rotates in bearings 95—96. A drive shaft 100 is rotatably mounted within the pump housing unit by means of bearings 101—102, and at one end is pinned as indicated at 103 to a stub shaft 104 having formed integrally therewith a spline 105 which meshes with a driving member of the turbojet engine extending into the gear box structure 75.

A multiple disc clutch as indicated at 106 is mounted on the drive shaft 100; alternate discs of the clutch 106 being keyed to the shaft 100 while the intermediate discs thereof are keyed to a clutch housing member 108 which in turn is bolted to a gear wheel 109 meshing with spur gears 110—111 carried by the fuel and oxidant pump shafts, respectively. The plates of the clutch 106 are arranged to be pressed into relative engagement by means of a piston member 112 which is fluid-pressure actuated by means of pilot controlled valve 113 regulating introduction of fluid under pressure into the space 114 behind the piston 112. Thus, it will be appreciated that upon introduction of fluid under pressure into the space 114 the piston 112 will be driven to energize the clutch 106 whereby the power delivered to the drive shaft 100 will be transmitted to the pump shafts 84, 94 for operation of the corresponding pumps and delivery of fuel and oxidant to the rocket motors as explained hereinabove. A series of spring devices 115 are arranged around the piston housing for return of the piston 112 to clutch disengaged position upon turning of the fluid pressure control valve to "off" position.

It is a particular feature of the present invention that the propellant pump unit thereof is readily mounted on the power take-off pad conventionally furnished as a part of the standard accessory gear box of present day aircraft engines. Hence, such engines may be readily converted to the composite engine arrangement of the present invention with minimum effort and without alteration of the primary engine. Also, it is a particular feature of the invention that the propellant pump unit of the composite arrangement is mechanically coupled to the main engine turbine shaft, as distinguished from arrangements such as employ air or gas bleed diversions from the main engine to power accessory turbines for driving the propellant pumps. Such arrangements are greatly inferior to the arrangement of the present invention because they impose higher performance losses on the turbojet engine for a given pump power requirement.

Preferably, the pump drive shaft 104 is provided with some form of overload protection device such as a reduced neck portion as indicated at 116 (Fig. 3) whereby in event of mechanical failure and jamming of the auxiliary mechanism the shaft 104 will shear. Thus, the auxiliary mechanism will be automatically disconnected from the main engine and the turbojet engine will thus be permitted to continue to operate at top efficiency. Lubricating oil for the bearings within the pump unit is readily arranged for by connecting any suitable oil lead from the main engine lubricating system into communication with an oil intake port 118 provided in the pump casing (Figs. 2-3); the port 118 leading into the interior of the pump mechanism for distribution to the moving parts therein. Seals as indicated at 120—122 are provided to separate the pump impeller chamber portions of the unit from the mechanical drive portions thereof requiring lubrication, so that leakages of corrosive and/or diluting oxidant and/or fuel substances into the pump parts and the lubricating oil of the unit are prevented. Thus, seepage chambers 124—126 are provided behind the impeller chambers of the pump unit; and the seepage chambers are vented at their upper portions as indicated at 127—128, and provided with overboard drain ports as indicated at 129—130, respectively. Thus, it will be appreciated that seepages of oxidant or fuel substances into the chambers 124—126 will simply escape therefrom through the drain devices without contact with the lubricating oil within the mechanical drive portion of the pump unit.

Thus, it will be appreciated that the composite engine arrangement of the present invention will enable an airplane to take off in a shorter distance and to operate at an increased rate of climb and to climb and operate effectively above the normal ceiling, compared to aircraft employing the same type primary engine without the auxiliary unit of the invention. The present invention provides the above stated objects by minimum alteration of a standard type engine and addition thereto of an accessory unit device which is relatively simple and reliable and of minimum bulk and weight. Furthermore, the starting response time of the pump unit in the arrangement of the present invention is minimum; the main engine component of the arrangement suffering the least possible performance loss. The thrust augmentation system of the present invention has the additional advantage of possessing the inherent feature of rockets in that the auxiliary rocket motor performance does not decrease with increasing altitude, as in the case of wholly air breathing engines.

Whereas, only one form of the invention has been shown and described in detail, it will be aparent to those skilled in the art that the invention is not so limited but that various changes may be made therein without departing from the spirit of the invention or the scope of the appended claims.

We claim:

1. A composite engine arrangement for aircraft comprising, in combination with a turbojet engine of the type having as a part thereof an accessory gear box housing a gear system for driving accessory equipment and including a power take-off pad, a pump-fed rocket type auxiliary thrust engine, and a propellant pump for feeding said rocket engine, said pump being mounted upon said power take-off pad and mechanically coupled to and driven by said accessory gear system.

2. A composite engine arrangement for aircraft comprising, in combination with a turbojet engine of the type having an accessory gear box housing a gear system for driving accessory equipment and including as a part thereof a power take-off pad, a pump-fed rocket type auxiliary thrust engine, and a single drive dual propellant pump for feeding said rocket engine, said pump being mounted upon said power take-off pad and having the drive shaft thereof mechanically coupled to and driven by said accessory gear system.

3. A composite engine arrangement for aircraft comprising, in combination with a main engine having an accessory gear box housing a gear system for driving accessory equipment, a pump-fed rocket type auxiliary thrust engine, and a propellant pump for feeding said rocket engine, said pump being mounted upon said main engine accessory gear box and including a clutch device mechanically coupling said pump to said accessory gear system of said main engine.

4. A composite engine arrangement for aircraft comprising, in combination with a main engine having an accessory gear box housing a gear system for driving accessory equipment from said engine, a pump-fed rocket type auxiliary thrust engine, and a single pump unit comprising dual propellant pump devices for separately feeding different propellants to said rocket engine, said pump unit being mounted upon said main engine accessory gear box and having a single drive shaft mechanically coupled to and driven by said accessory gear system of said main engine.

5. A composite engine arrangement for aircraft comprising, in combination with a turbojet engine having an accessory gear box housing a gear system for driving accessory equipment directly from said engine, a pump-fed rocket type auxiliary thrust engine, and a propellant pump for feeding said rocket engine, said pump being mounted upon said turbojet engine accessory gear box and including a clutch device mechanically coupling said pump to said accessory gear system of said engine through a shaft incorporating an overload release device.

6. A composite engine arrangement for aircraft comprising, in combination with a turbojet engine having an accessory gear box housing a gear system for driving accessory equipment directly from said engine, a plurality of pump-fed rocket type auxiliary thrust engines, and a single pump unit comprising dual propellant pump devices each having plural delivery systems for separately feeding different propellants to said rocket engines, said pump unit being mounted upon said turbojet engine accessory gear box and having a single overload-protected drive shaft mechanically coupled to and driven by said accessory gear system of said engine.

References Cited in the file of this patent

UNITED STATES PATENTS

| 1,629,121 | Russell et al. | May 17, 1927 |
| 2,095,845 | Warren | Oct. 12, 1937 |
| 2,168,669 | Ernst | Aug. 8, 1939 |
| 2,432,825 | Sloane | Dec. 16, 1947 |
| 2,531,761 | Zucrow | Nov. 28, 1950 |
| 2,548,858 | Benedict | Apr. 17, 1951 |